(12) United States Patent
Platt et al.

(10) Patent No.: US 7,755,024 B2
(45) Date of Patent: Jul. 13, 2010

(54) SAFETY SENSING SYSTEM FOR A POWERED DOOR SYSTEM

(75) Inventors: Terence Christopher Platt, Binfield Berks (GB); Robert Douglas Wells, Bucks (GB)

(73) Assignee: MEMCO Limited, Maidenhead Berks (GB)

( * ) Notice: Subject to any disclaimer, the term of this patent is extended or adjusted under 35 U.S.C. 154(b) by 90 days.

(21) Appl. No.: 11/667,782

(22) PCT Filed: Nov. 15, 2005

(86) PCT No.: PCT/GB2005/004382

§ 371 (c)(1),
(2), (4) Date: Dec. 11, 2007

(87) PCT Pub. No.: WO2006/051327

PCT Pub. Date: May 18, 2006

(65) Prior Publication Data

US 2008/0204229 A1    Aug. 28, 2008

(30) Foreign Application Priority Data

Nov. 15, 2004 (GB) .................................. 0425194.8

(51) Int. Cl.
*B66B 13/26* (2006.01)
(52) U.S. Cl. ........................ 250/221; 250/224; 250/239; 340/555; 340/556; 340/557
(58) Field of Classification Search ................. 250/221, 250/224, 239; 340/555, 556, 557
See application file for complete search history.

(56) References Cited

U.S. PATENT DOCUMENTS

| 3,742,222 | A | 6/1973 | Endl et al. |
| 4,354,106 | A | 10/1982 | Walter et al. |
| 4,650,990 | A | 3/1987 | Jonsson et al. |
| 4,794,248 | A | 12/1988 | Gray et al. |
| 5,053,616 | A | 10/1991 | Trett et al. |
| 5,130,532 | A | 7/1992 | Clemens et al. |

(Continued)

FOREIGN PATENT DOCUMENTS

DE    3620227 C1    8/1987

(Continued)

OTHER PUBLICATIONS

European Search Report for European Application No. 09180049.0 dated Feb. 17, 2010.

*Primary Examiner*—Seung C Sohn
(74) *Attorney, Agent, or Firm*—Harness, Dickey & Pierce, P.L.C.

(57) ABSTRACT

A safety sensing system includes an apparatus for use in a doorway having a powered door slidable for closure of the doorway. The apparatus includes radiation transmitters and/or receivers for providing a curtain of detection beams across the doorway, and is formed as a composite structure that includes: a fixative member connectable by securing means to a side of the doorway at a door frame, the fixative member including a first portion of a mating connection means; and, a housing containing a plurality of the transmitters and/or receivers along its length, and including a second portion of the mating connection means for attaching the sealed housing to the fixative member. The mating connection means allows the housing to be removed and replaced while the fixative member remains in situ.

27 Claims, 12 Drawing Sheets

U.S. PATENT DOCUMENTS

| | | |
|---|---|---|
| 5,424,717 A | 6/1995 | Platt et al. |
| 5,900,598 A | 5/1999 | Cottle et al. |
| 6,348,685 B1 | 2/2002 | Givet et al. |
| 6,547,042 B1 | 4/2003 | Collins et al. |
| 6,774,352 B2 * | 8/2004 | Koyama et al. ............ 250/221 |

FOREIGN PATENT DOCUMENTS

| | | |
|---|---|---|
| DE | 4323910 A1 | 1/1995 |
| EP | 0369386 | 5/1990 |
| EP | 0 519 686 A | 12/1992 |
| EP | 0567717 A1 | 3/1993 |
| GB | 2353855 A | 3/2001 |
| GB | 2369185 | 5/2002 |
| GB | 2395474 | 5/2004 |
| WO | 2004094290 A | 11/2004 |

* cited by examiner

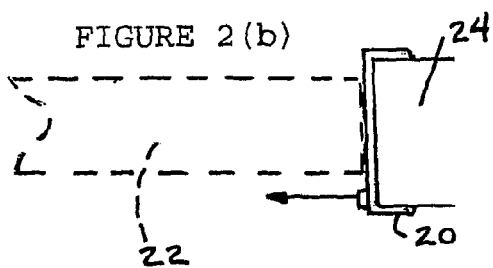
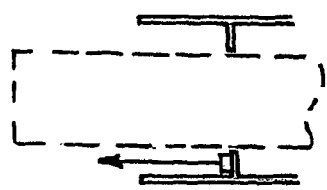
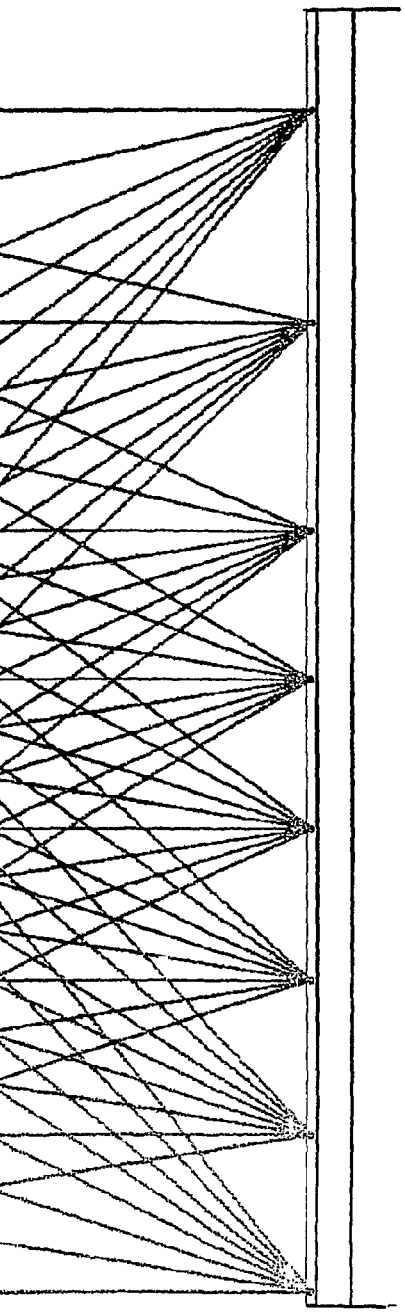
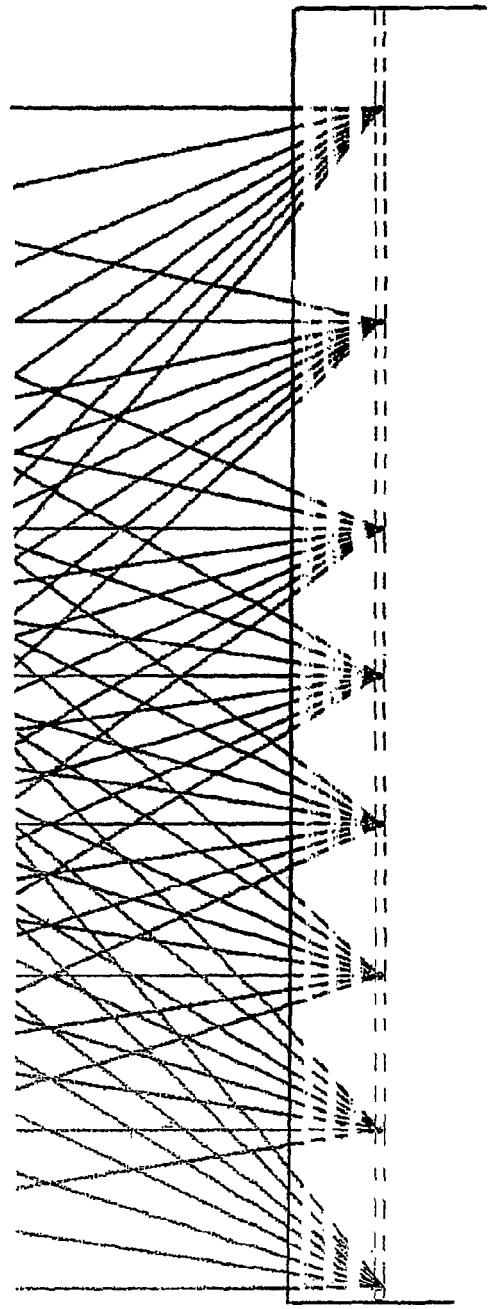
FIGURE 2(a)
FIGURE 3(a)

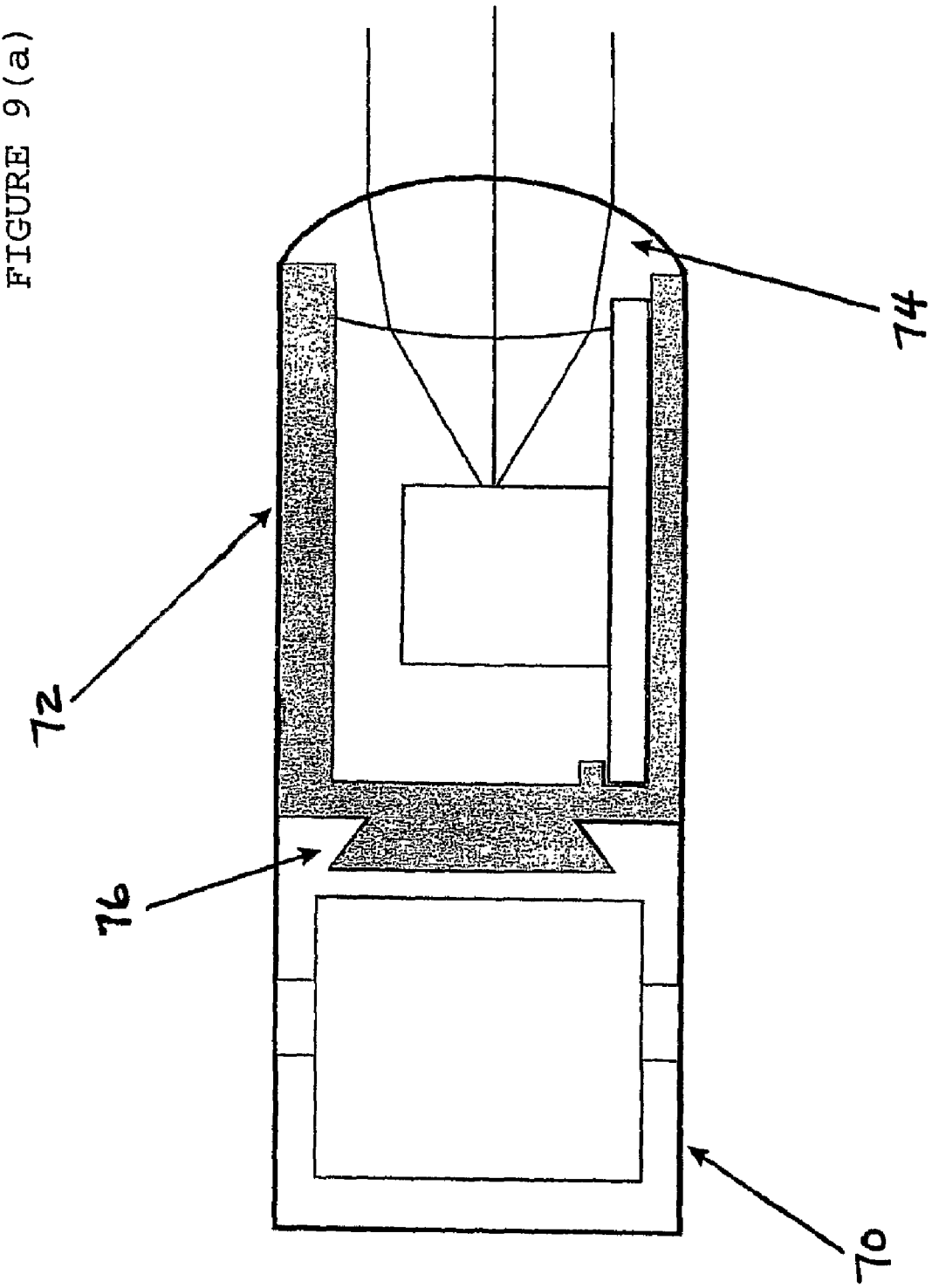

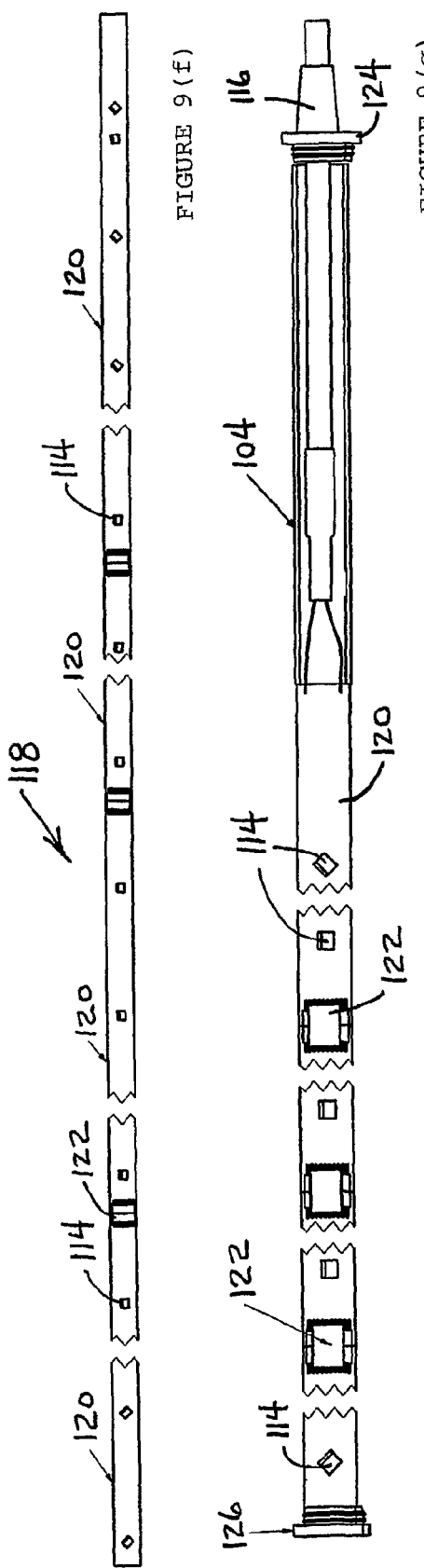
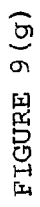
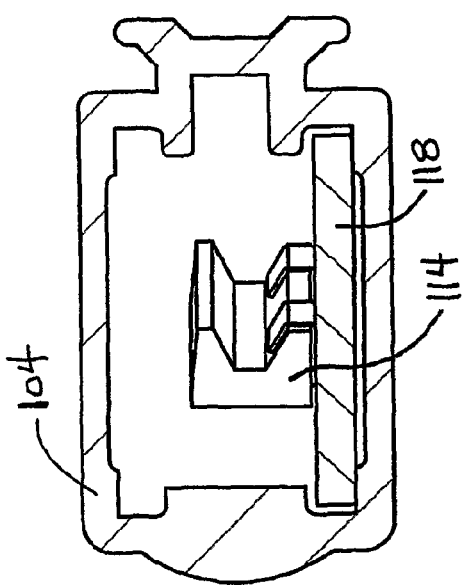
FIGURE 9(f)
FIGURE 9(g)
FIGURE 9(h)

SAFETY SENSING SYSTEM FOR A POWERED DOOR SYSTEM

CROSS-REFERENCE TO RELATED APPLICATIONS

This application is a National Stage of International Application No. PCT/GB2005/004382, filed Nov. 15, 2005. This application claims the benefit of GB 0425194.8, filed Nov. 15, 2004. The disclosures of the above applications are incorporated herein by reference.

The invention relates to a safety sensing system for a powered door, such as an elevator door, and more particularly to a safety sensing system having a broader coverage area and a reduced level of power consumption than existing systems.

Elevator systems are divided about evenly between those with centre-opening doors and those with side-opening doors. Infrared safety sensing systems for elevator doorways include a series of transmitters, e.g. transmitting diodes, on one side of the doorway and a series of receivers, e.g. receiving diodes, on the other side. This is illustrated in FIG. 1. In the following description, the term "elevator doorway" is intended to refer to the doorway of an elevator car itself rather than to the elevator doorway on each landing. The system could be employed for the doorway on each landing; however, such approach is obviously less cost-effective than employing it on the elevator car.

When one or more of the infrared beams passing from the transmitters to the receivers is broken by, for instance, an arm or leg of a person entering the plane of the infrared beams (the beam plane), the non-sensing, by one or more of the receivers, of the broken infrared beam or beams causes a circuit to operate to delay closure of the elevator door. For effective operation, the transmitters should be recessed from that side of the doorway where they are located. Centre-opening doors allow for such recessing, since the doors on both sides of the doorway enter into a respective wall cavity, which provides a respective recess. When recessed, the transmitters provide infrared beams that have significantly diverged by the time they enter into the doorway. Thus, with centre-opening doors, there is less chance of an arm or leg of a passenger passing between the beams when the passenger enters the beam plane close to the transmitter-side of the doorway.

The difficulty with a side-opening door is that there is no wall cavity on the side of the doorway which the door contacts on closing. The door makes contact with what is called a "slam post", which is normally a heavy steel member extending along the one side of the doorway. There is usually difficulty in recessing transmitting diodes behind the slam post, and instead they are normally placed onto the surface of the slam post. The difficulty with that arrange-mint is that the infrared beams only begin their divergence from that location, and large triangular areas exist across which no beams extend. This is illustrated by comparing FIG. 2, which represents plan and side views of a transmitter side of a side-opening door system, with FIG. 3, which represents plan and side views of a corresponding transmitter-side of a centre-opening door system.

Another problem with existing sensing systems for powered door systems is noise effects, e.g. light shadows passing over receiver diodes or a burst of spark-generated RF noise from a motor. Fluctuations in light and electrical noise at the receivers can result in amplification being required for the received signals, but this in turn amplifies the noise effects. Typical present systems use bursts of modulated infrared radiation about 10 cycles long (1 millisecond of 10 kHz), with the receiver diodes receiving very weak signals (only about 1 mV). This results in a need for large amplification of the received signals, but the amplification also increases received noise. What is required is a means for reducing sensed noise effects from received signals or a means for amplifying the received signals without also amplifying the noise effects, in other words, a way of improving the signal-to-interference ratio.

A related problem with the transmission of infrared radiation of short duration is the lack of synchronization in the timing between the transmitting diodes and the receiving diodes caused by capacitive effects on the wiring that connects them; such wiring may often extend to ten feet in length.

A fourth problem with existing systems relates to the removal and replacement of defective transmitting diodes or receiving diodes from supporting structure holding them in position on a doorway. The complete supporting structure needs to be removed from the doorway, which is both time-consuming and awkward.

The subject invention is directed toward overcoming the aforementioned problems with powered door means. Solutions to the above-described problems with powered door systems are next described in general terms. A solution to the first-described problem with side-opening doors involves increasing the number of infrared transmitters on the slam post, with adjacent transmitters being more closely positioned than in existing systems. This arrangement may also be employed on centre-opening doors if for some reason recessing in the doors is to be avoided. A solution to the second-described problem of noise effects is to cause each transmitter to produce an infrared pulsed signal of greater intensity but much reduced duration than infrared signals in conventional systems. After reception, the transmitted pulses are passed through noise-reducing circuitry for reducing the effect of noise on the pulses. A solution to the synchronization problem is to install trigger means such as Schmitt-trigger devices at each end of lines that connect transmission circuitry to reception circuitry, in particular at both ends of clock signal lines.

In a first aspect, the subject invention is a safety sensing system for use in a doorway having powered door means slidable for closure of the doorway, the system including respective arrays of radiation transmitters and radiation receivers positionable to provide a curtain of detection beams across the doorway from the transmitters to the receivers. The vertical separation between adjacent ones of the receivers is greater than the vertical separation between adjacent ones of the transmitters.

Preferably, the vertical separation between adjacent ones of the receivers is a multiple of the vertical separation between adjacent ones of the transmitters.

Preferably, the number of transmitters is a multiple of the number of receivers. More preferably, the transmitters are arranged in 'm' banks, each transmitter being uniquely selectable by means of a bank selector and a 1-of-n selector, where 'n' is the number of transmitters in each bank. Even more preferably, 'm' is two and 'n' is eight, and the system has sixteen transmitters, or 'm' is four and 'n' is eight, and the system has thirty-two transmitters. Still more preferably, the system has eight or four receivers.

Preferably, the transmitters and receivers operate with time-division multiplexing.

Preferably, the vertical separation between adjacent pairs of transmitters is not the same for all of the adjacent pairs of transmitters. More preferably, the distances between respective adjacent pairs of transmitters varies in the same proportion as the distances between respective adjacent pairs of receivers.

Preferably, the powered door means includes a single door panel, or includes a pair of telescoping door panels that move in the same direction.

Preferably, the receivers have a multiplexed receiving mode in which only one of the receivers is able to receive radiation from the transmitters during a respective one of multiplexed time periods, and wherein during each such time period all of the transmitters emit radiation sequentially.

Preferably, the system further includes a channel member, the transmitters being positioned along the length of the channel member. More preferably, the channel member has a generally rectangular profile. Preferably, the channel member has a radiation-transparent side through which radiation is able to pass, and wherein other sides of the channel member are opaque. More preferably, the radiation-transparent side of the channel member is shaped so as to focus radiation passing therethrough. The channel member may be made from a polycarbonate co-extrusion.

Preferably, a slam post extends on one side of the doorway, and the channel member is securable to a slam-post surface that faces the receivers or to a side of the slam post.

Preferably, the channel member is formed as a composite structure that comprises a metal reinforcing bar and a plastics housing, the plastics housing being removably connectable to the bar. More preferably, the metal reinforcing bar is removably connectable to the housing by means of a keyway extending lengthwise therebetween.

Preferably, the plastics housing has a radiation-transparent side through which radiation is able to pass, and wherein other sides of the channel member are opaque. More preferably, the radiation-transparent side of the plastics housing forms an opposite side of the housing from a side by which the plastics housing is removably connected to the bar.

Preferably, a slam post extends on one side of the doorway, and the metal reinforcing bar is securable to a slam-post surface that faces the receivers or to a side of the slam post.

Preferably, the receivers are positioned along the length of a second channel member. More preferably, the second channel member has a generally rectangular profile.

Preferably, the second channel member has a radiation-transparent side through which radiation is able to pass, and other sides of the second channel member are opaque.

Preferably, the second channel member is securable to a surface at the other side of the doorway such that the receivers face the transmitters.

Preferably, the channel member extends for the full height of the doorway and is, e.g. approximately 2 to 2.5 meters long, and the second channel member is preferably of the same length.

In a second aspect, the subject invention is a safety sensing system for use in a doorway having powered door means slidable for closure of the doorway, the system including: respective arrays of radiation transmitters and radiation receivers positionable to provide a curtain of detection beams across the doorway from the transmitters to the receivers; means for driving the transmitters sequentially to emit pulses of radiation; and, noise-reducing means for reducing the effect of ambient noise on detection signals derived from the pulses received by the receivers.

Preferably, the noise-reducing means includes means for establishing a detection-signal reference level by blocking the receiver output arising from a steady ambient noise condition sensed by the receiver between pulses. More preferably, an AC-coupled amplifier provides the blocking.

Preferably, the noise-reducing means includes means for filtering-out detection signals arising from transient perturbations of the steady ambient noise condition between pulses.

Preferably, the noise-reducing means includes a capacitor the output of which is clamped to ground during intervals between pulses.

Preferably, the noise-reducing means includes: amplifier means having its input sequentially connectable to the output of each receiver; capacitor means having its input connected to the output of the amplifier means; pulse-detection means having its input connected to the output of the capacitor means; and, switching means for clamping the output of the capacitor means to ground during inter-pulse periods between reception of pulses.

Preferably, the transmitters each transmit radiation in a respective time slot of a multiplexed sequence, each of the transmitters transmitting one pulse per time slot.

Preferably, the vertical separation between adjacent ones of the receivers is greater than the vertical separation between adjacent ones of the transmitters. More preferably, the number of transmitters is a multiple of the number of receivers. More preferably, the transmitters are arranged in 'm' banks, each transmitter being uniquely selectable by means of a bank selector and a 1-of-n selector, where 'n' is the number of transmitters in each bank.

Preferably, the receivers have a multiplexed receiving mode, wherein only one of the receivers is able to receive radiation from the transmitters during a respective one of multiplexed time periods, and wherein during each such time period all of the transmitters emit radiation sequentially.

Preferably, the powered door means is slidable for closure against a slam post on one side of the doorway.

Preferably, the system includes a channel member, and the transmitters are housed within the channel member to extend along the length of the channel member. More preferably, the channel member has a generally rectangular profile.

Preferably, the channel member has a radiation-transparent side through which radiation is able to pass, and other sides of the channel member are opaque. More preferably, the radiation-transparent side of the channel member is shaped so as to focus radiation passing therethrough.

Preferably, the channel member is made from a polycarbonate co-extrusion and is preferably approximately 2 meters long.

Preferably, the powered door means is slidable for closure against a slam post on one side of the doorway, the system includes a channel member adapted to extend along the length of the slam post, and the transmitters are housed within the channel member to extend along the length of the channel member.

Preferably, the receivers are positioned along the length of a second channel member. More preferably, the second channel member has a radiation-transparent side through which radiation is able to pass, and other sides of the second channel member are opaque.

Preferably, the intensity of each pulse is above a level which the transmitters are capable of emitting on a continuous basis.

Preferably, each of the pulses is produced by applying a current of approximately 500 milliamperes to a respective transmitter for the duration of the pulse. More preferably, the duration of each pulse is approximately 10 microseconds.

Preferably, the safety sensing system also includes timing-signal synchronizing means for causing a transmitter to be actuated in response to and in synchronism with actuation of a receiver.

In a third aspect, the subject invention is a safety sensing system for use in a doorway having powered door means slidable for closure of the doorway, the system including respective arrays of radiation transmitters and radiation receivers positionable to provide a curtain of detection beams across the doorway from the transmitters to the receivers. The system also includes timing-signal synchronizing means for causing a transmitter to be actuated in response to and in synchronism with actuation of a receiver.

Preferably, the system also includes a first actuator for actuating the transmitters and a second actuator for actuating the receivers, the first and second actuators having respective first and second clock-signal-input lines, and wherein the timing-signal synchronizing means includes a trigger means on the first clock-signal-input line for synchronizing timing of transmitter actuation with receiver actuation. More preferably, the trigger means is a Schmitt-trigger device.

Preferably, the timing-signal synchronizing means also includes a further trigger means on the second clock-signal-input line. More preferably, that further trigger means is also a Schmitt-trigger device.

Preferably, in all aspects each transmitter and each receiver are, respectively, a transmitter and receiver of infrared radiation. More preferably, each transmitter and receiver are, respectively, a transmitter diode and a receiver diode.

In a fourth aspect, the subject invention provides a transmitter and/or receiver assembly for doorway obstruction sensing apparatus in which a curtain of detection beams is provided across a doorway, the assembly comprising an elongate sealed housing in which are disposed transmitter and/or receiver elements spaced along the length of the housing and oriented to transmit or receive radiation through a radiation-transparent side face of the housing, the housing being configured to engage fixative means for attachment to or adjacent a door or door frame of the doorway.

Preferably, the housing is of a generally rectangular tubular cross-section.

Preferably, other sides of the housing are opaque to the radiation.

Preferably, the radiation-transparent side of the housing is shaped so as to focus radiation passing therethrough. More preferably, the radiation-transparent side of the housing has a planar inner surface and a convex outer surface.

Preferably, the radiation-transparent side of the housing is integrally-formed with the other sides. More preferably, the radiation-transparent side is formed as a co-extrusion with the other sides of the housing. Even more preferably, the housing is formed as a plastics co-extrusion.

In a second form of the fourth aspect, the subject invention provides an apparatus comprising the assembly of the first form of the fourth aspect, in combination with fixative means shaped to engage and retain the housing.

Preferably, the fixative means encloses the housing so as to engage and retain it. More preferably, the internal shape of the fixative means approximates to the shape of the outside of the housing. Even more preferably, the securing means includes a resilient clip for gripping an edge of the door or door frame.

Preferably, the fixative means includes a first portion of a mating connection, the housing including a second portion of the mating connection, the mating connection allowing the housing to be removed and replaced whilst the fixative means remains in situ on the door or door frame.

In a third form of the fourth aspect, the subject invention provides a safety sensing apparatus for use in a doorway having a powered door slidable for closure of the doorway, the apparatus including radiation transmitters and/or receivers for providing a curtain of detection beams across the doorway, the apparatus being formed as a composite structure that includes: a fixative means connectable by securing means at or adjacent a door or door frame, the fixative means including a first portion of a mating connection; and, a housing containing a plurality of the transmitters and/or receivers along its length, and including a second portion of the mating connection for attaching the housing to the fixative member. The mating connection means allows the housing to be removed and replaced while the fixative member remains in situ.

Preferably, one portion of the mating connection is a key and the other is a mating keyway, the portions being connectable together by sliding the key into the keyway. More preferably, the second portion of the fixative means is formed integrally with the housing.

Preferably, the fixative means is configured to attach the housing to a surface of or adjacent the door or door frame such that the transmitters and/or receivers transmit/receive radiation parallel to the surface.

Preferably, the fixative means is configured to attach the housing to a surface of or adjacent the door or door frame such that the transmitters and/or receivers transmit/receive radiation normal to the surface.

A fourth form of the fourth aspect is an apparatus, as set out in the foregoing forms of the fourth aspect, when used in a safety sensing system for use in a doorway having a powered door slidable for closure. Preferably, the powered door is an elevator door.

Preferred features of the present invention will now be described, by way of example only, with reference to the accompanying drawings, in which:

FIG. 2(a) is a front view of the conventional arrange-mint of transmitters shown in FIG. 1;

FIG. 2(b) is a plan view of the conventional arrange-mint of transmitters shown in FIG. 2(a);

FIG. 3(a) is a front view of a conventional arrange-mint of transmitters in a centre-opening door system;

FIG. 3(b) is a plan view of the conventional arrange-mint of transmitters shown in FIG. 3(a);

FIG. 9(a) is a cross-section through a first type of composite channel-member apparatus used for housing transmitter and/or receiver diodes, the apparatus being positionable on a side surface of the slam post;

Figure 9B:
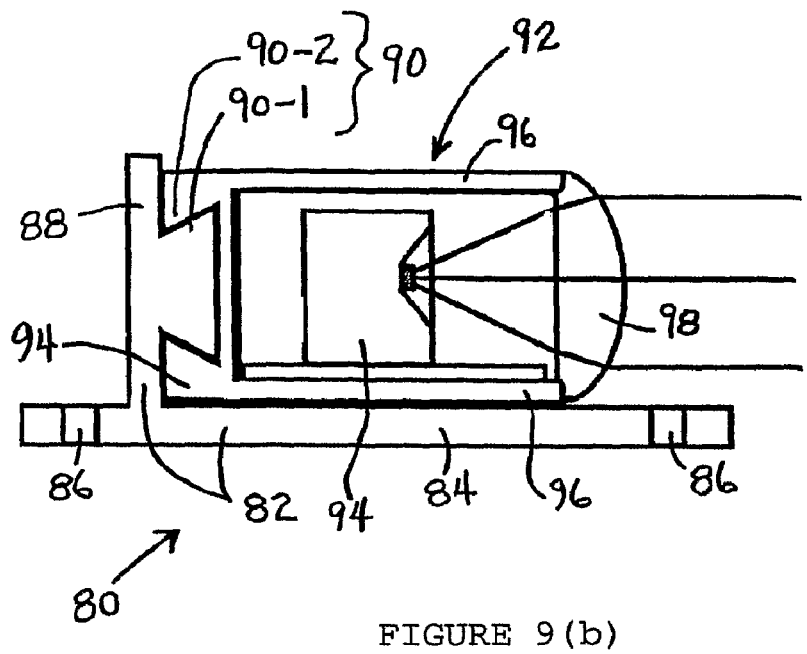
FIG. 9(b) is a cross-section through a second type of composite channel-member apparatus used for housing transmitter and/or receiver diodes, the apparatus being positionable on a side surface of the slam post.
Figure 9C:
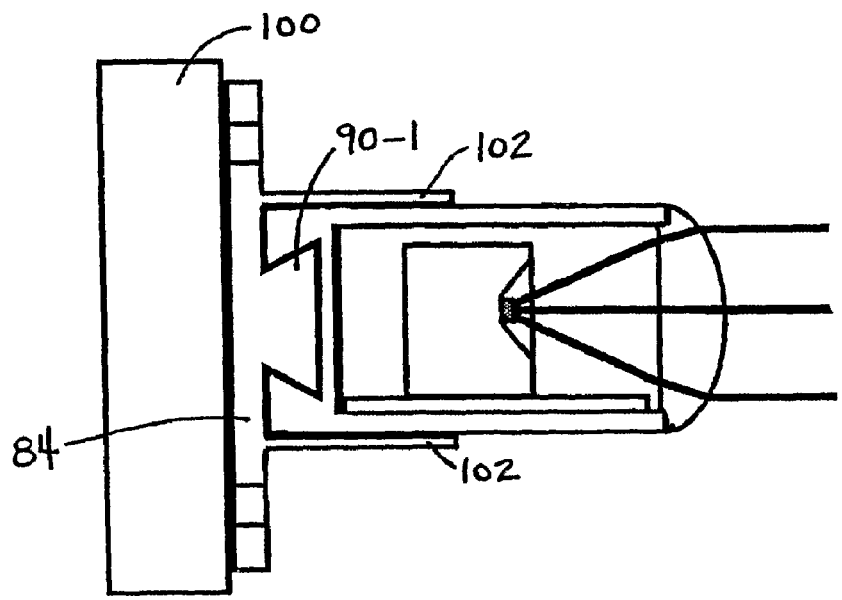
FIG. 9(c) is a cross-section through a third type of composite channel-member apparatus used for housing transmitter and/or receiver diodes, the apparatus being positionable on an end surface of the slam post.
Figures 9D, 9E:
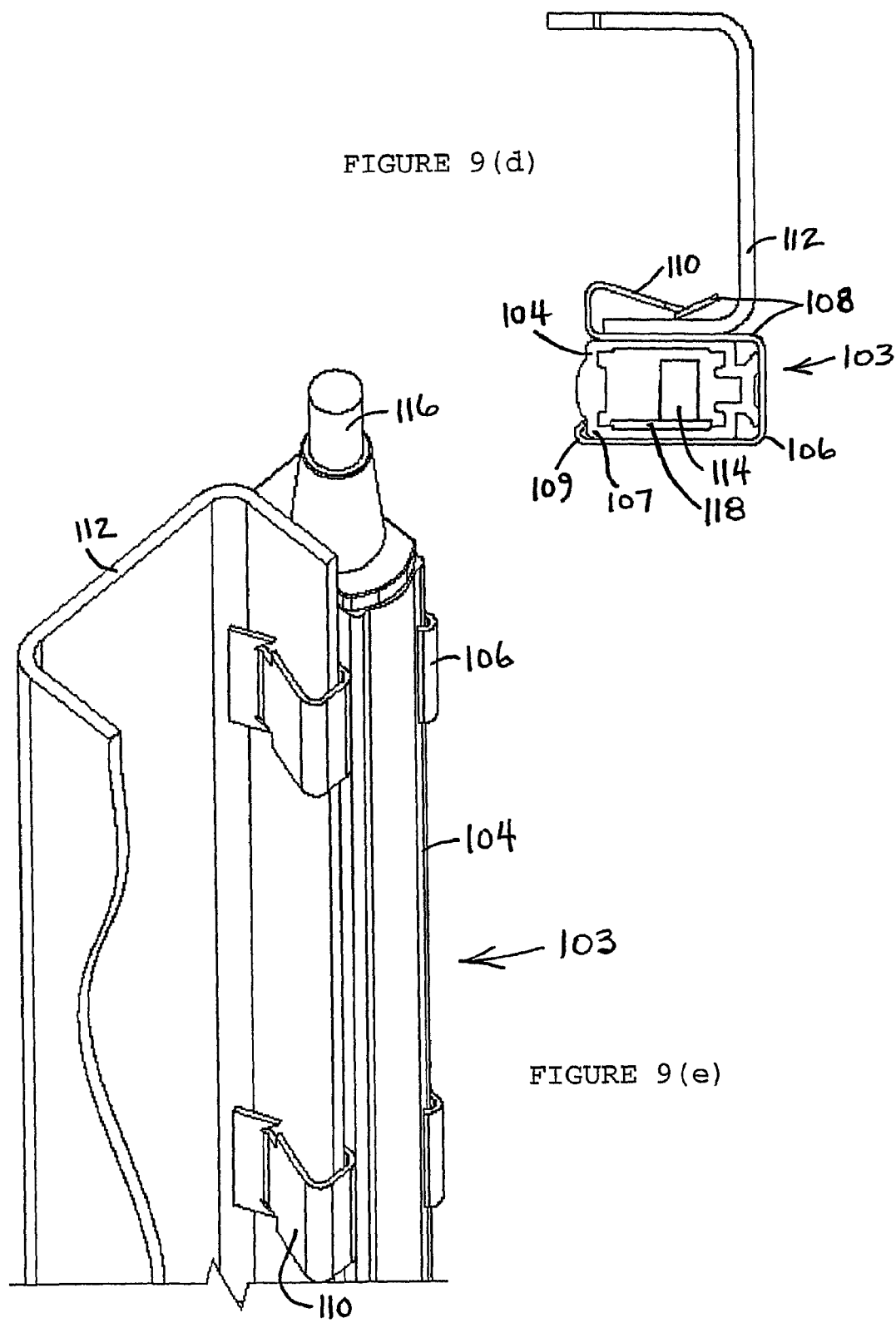
FIG. 9(d) is a cross-section through a fourth type of composite channel-member apparatus used for housing transmitter and/or receiver diodes, the apparatus being positionable on a side surface of the slam post.
FIG. 9(e) is a partial perspective view of the fourth type of composite channel-member apparatus of FIG. 9(d), the view illustrating a spring-clip portion of the apparatus holding the apparatus on the end surface of the slam post.
Figure 10:
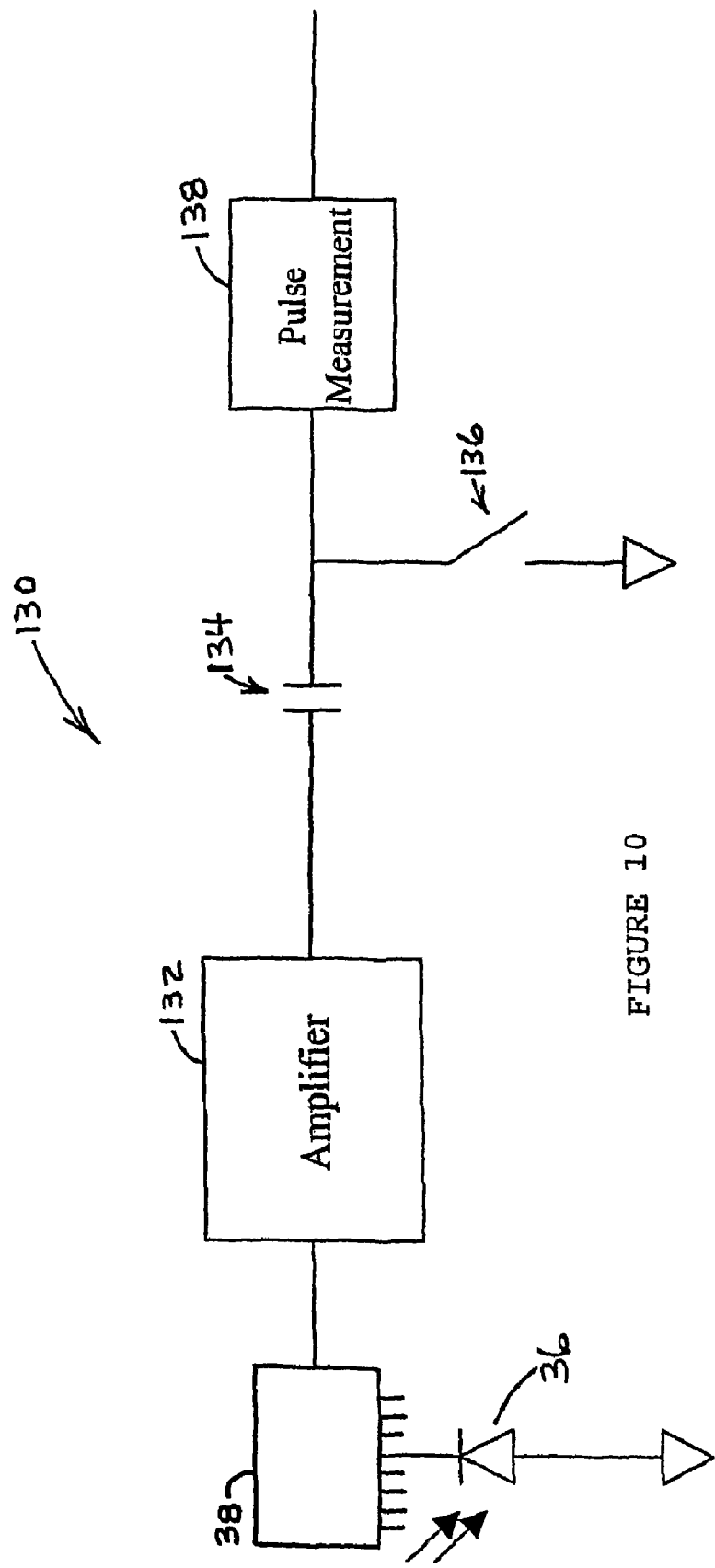
Figure 11:
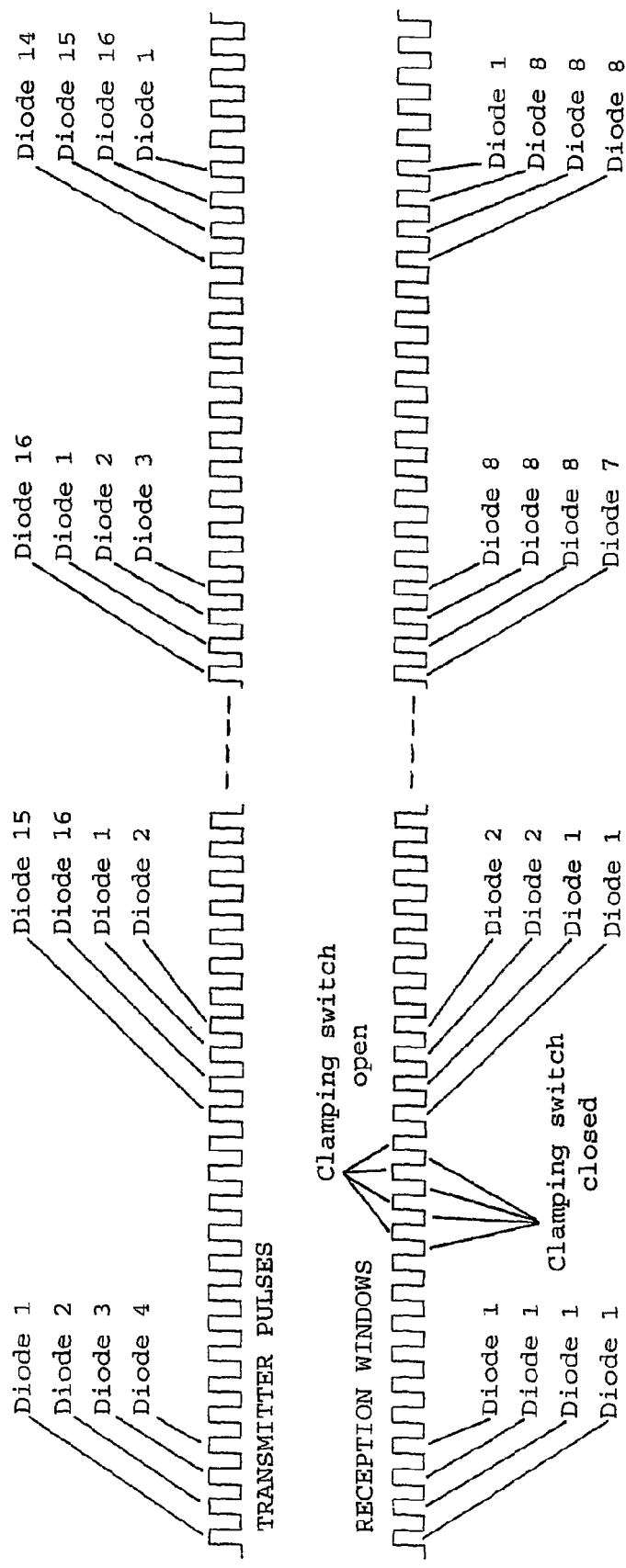

FIG. 9(f) is an exploded view of four connected sections of elongated printed circuit board forming together a single composite board extending the length of the housing (the housing itself not being shown), each connected section having eight embedded transmitter diodes (not all shown), the diodes at either end of the single board being oriented at an angle to a normal to the lengthwise direction of the housing;

FIG. 9(g) is an exploded sectional view of the housing shown in FIG. 9(e), illustrating transmitter diodes in spaced positions along the length of the composite board of FIG. 9(f);

FIG. 9(h) is a sectional view of the housing of the channel-member apparatus of FIGS. 9(d) and 9(g), the view showing a transmitter diode near an end of the composite board in the housing, the diode being oriented at an angle to the lengthwise direction of the housing;

FIG. 10 is a schematic diagram of pulse-sampling circuitry connected to the receiving diodes for sampling pulses received and removing noise effects; and, FIG. 11 illustrates correspondence in timing between pulses transmitted by the transmitter diodes and reception windows created by the pulse-sampling circuitry for sensing the transmitted pulses.

Figure 4:
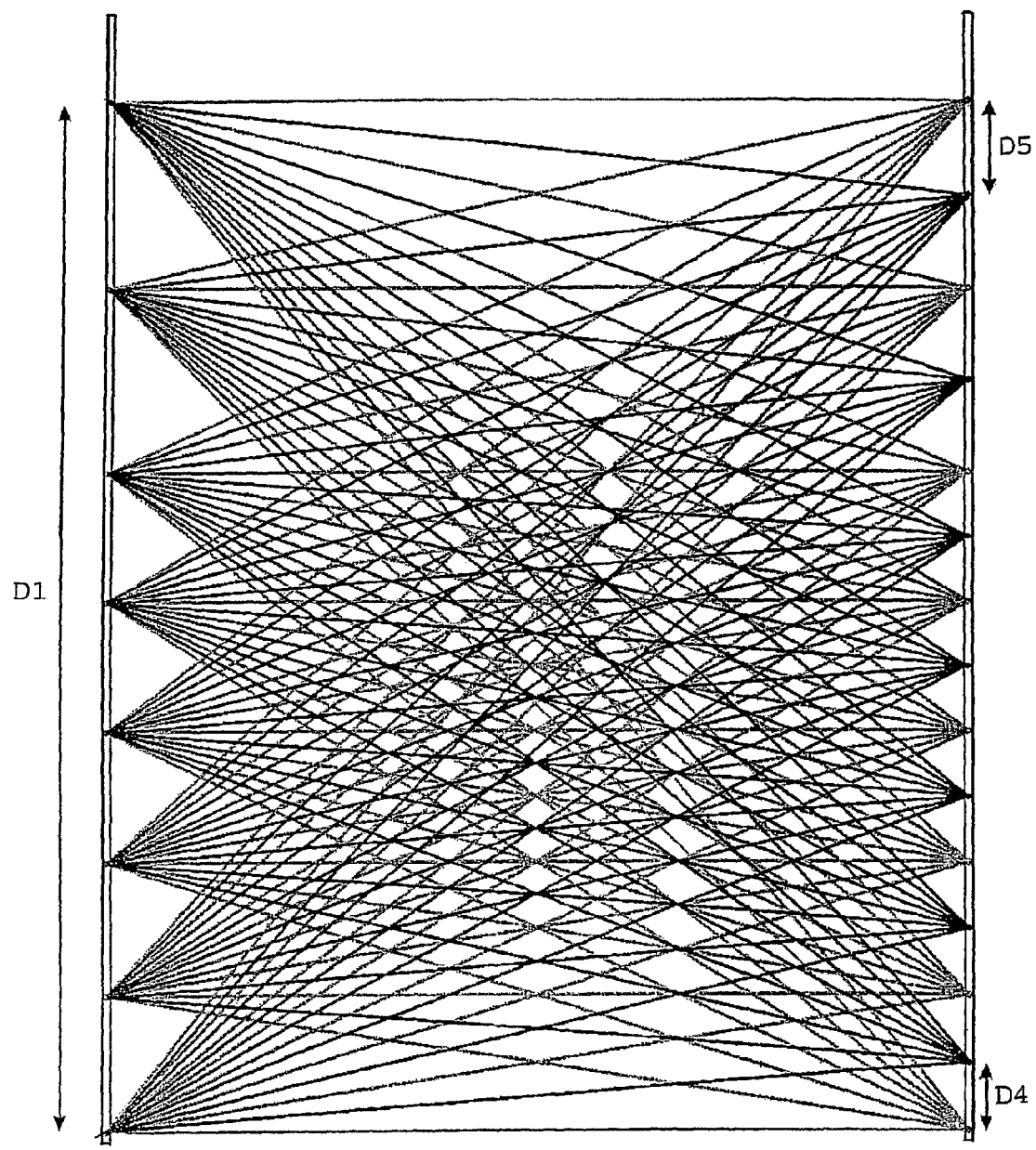
FIG. 4 is a front view of a side-opening door system fitted with transmitters and receivers according to the first aspect of the subject invention, the system having 16 transmiters and 8 receivers.

As illustrated in FIGS. 4 and 5(b) with respect to the first aspect of the subject invention, a greater number of transmitter diodes are positioned on the slam post than in conventional systems. The position of a slam post 20 on a side-opening door system can be seen from the plan view of FIG. 2(b). A door of the system is shown in outline and designated 22, and the wall on which the slam post 20 is mounted is designated 24.

Figure 1:
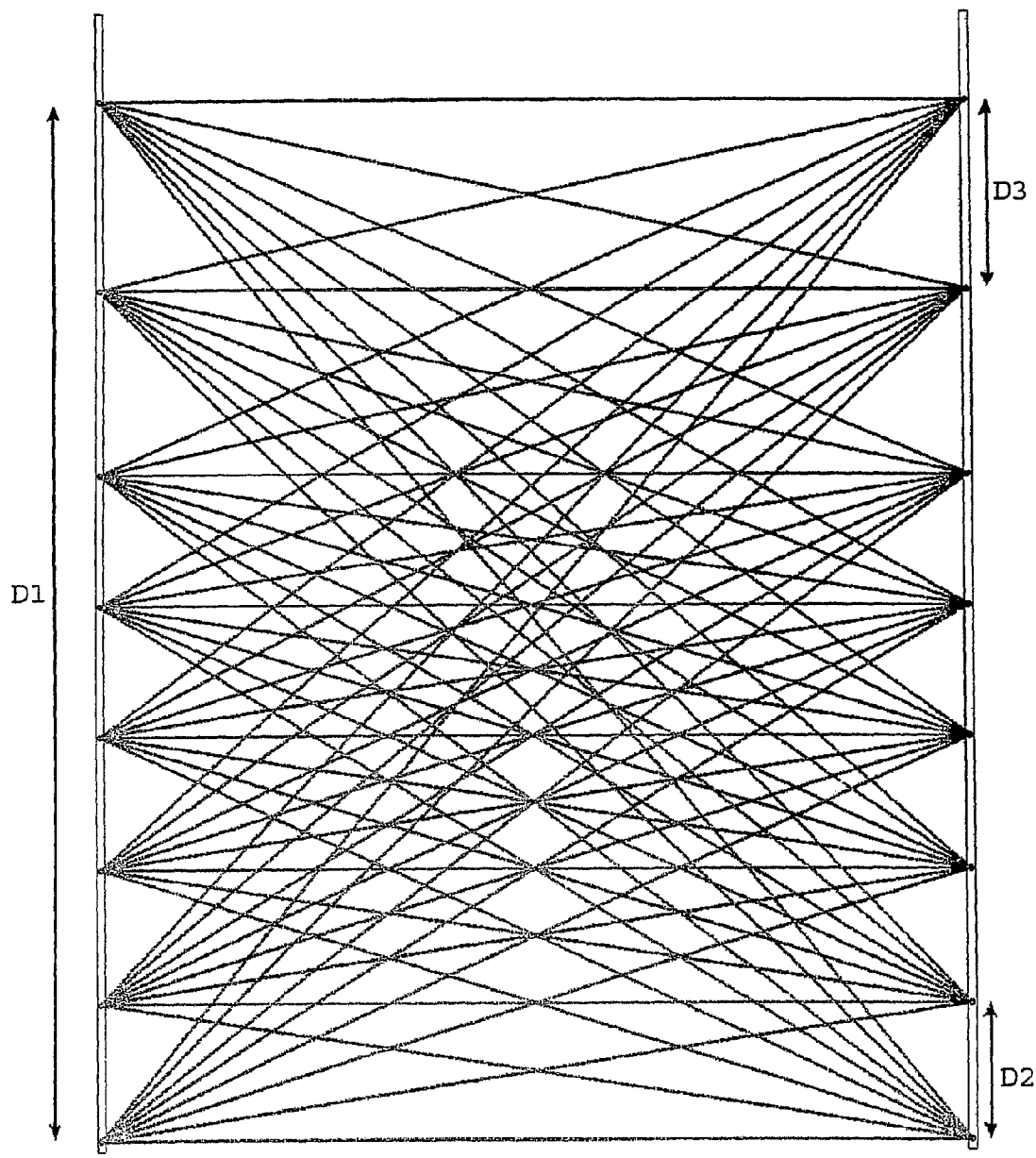
FIG. 1 is a front view of a conventional arrangement of transmitters and receivers in a side-opening door system.

In the conventional side-opening door system of FIG. 1, the distances D1, D2 and D3 are, respectively, 1830 mm, 234 mm and 330 mm. D2 and D3 differ from each other because the spacing between adjacent diodes normally increases with height, both on the infrared transmission side and on the infrared receiver side. In the embodiment of the subject invention depicted in FIG. 4, the distance D1 on the reception side remains the same as in FIG. 1 but the distances D4 and D5 on the transmission side are respectively one-half those of D2 and D3, i.e. D4 and D5 are respectively 117 mm and 165 mm. In FIG. 5(b), the spacing between ajar-cent pairs of transmitter diodes is the same at the top as at the bottom, and similarly with the receiver diodes. It is possible that transmitter and receiver diodes could be positioned such that the spacing between adjacent diodes increases from bottom to top, as in FIG. 4.

Figure 5:
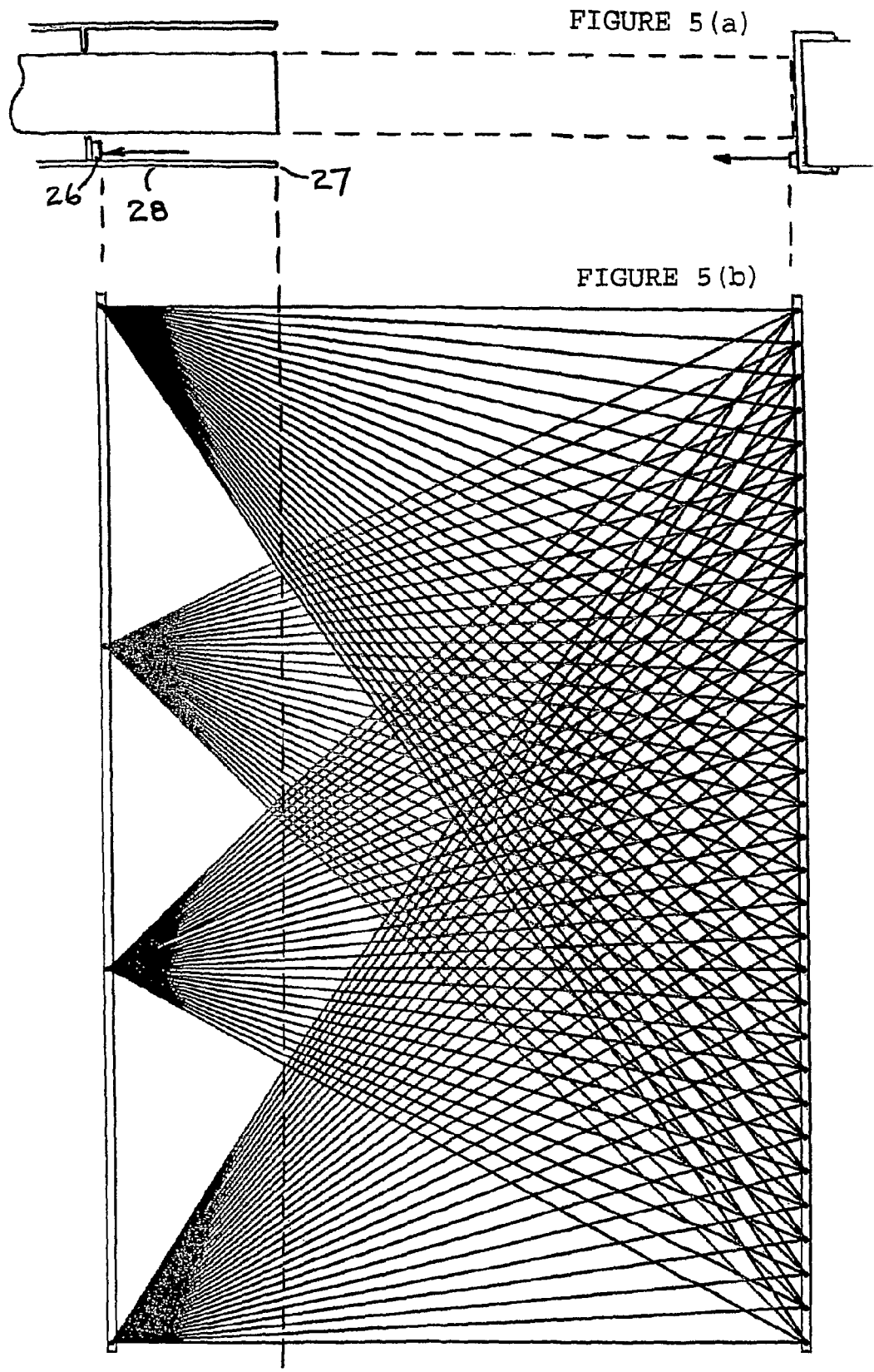
FIG. 5(a) is a plan view of another side-opening door system fitted with transmitters and receivers according to the first aspect of the subject invention.
FIG. 5(b) is a front view of the door system of FIG. 5A, the system having 32 transmitters and only 4 receivers, the position of a left side of the doorway being shown by the dashed vertical line.

FIG. 5(b) shows 32 transmitter diodes (right side) and only 4 receiver diodes (left side). This creates a very dense beam pattern adjacent the transmitter side at the slam post, but large gaps between the four receivers 26. However, the receivers 26 are sufficiently recessed from the right edge 27 of the wall 28 in FIG. 5(a) that there are no beam gaps showing at the left side of the doorway (to the right of the dashed vertical line in FIG. 5 (b)). Thus the beams shown in FIG. 5(b) essentially cover all of the doorway area through which a person passes.

Figure 7A:
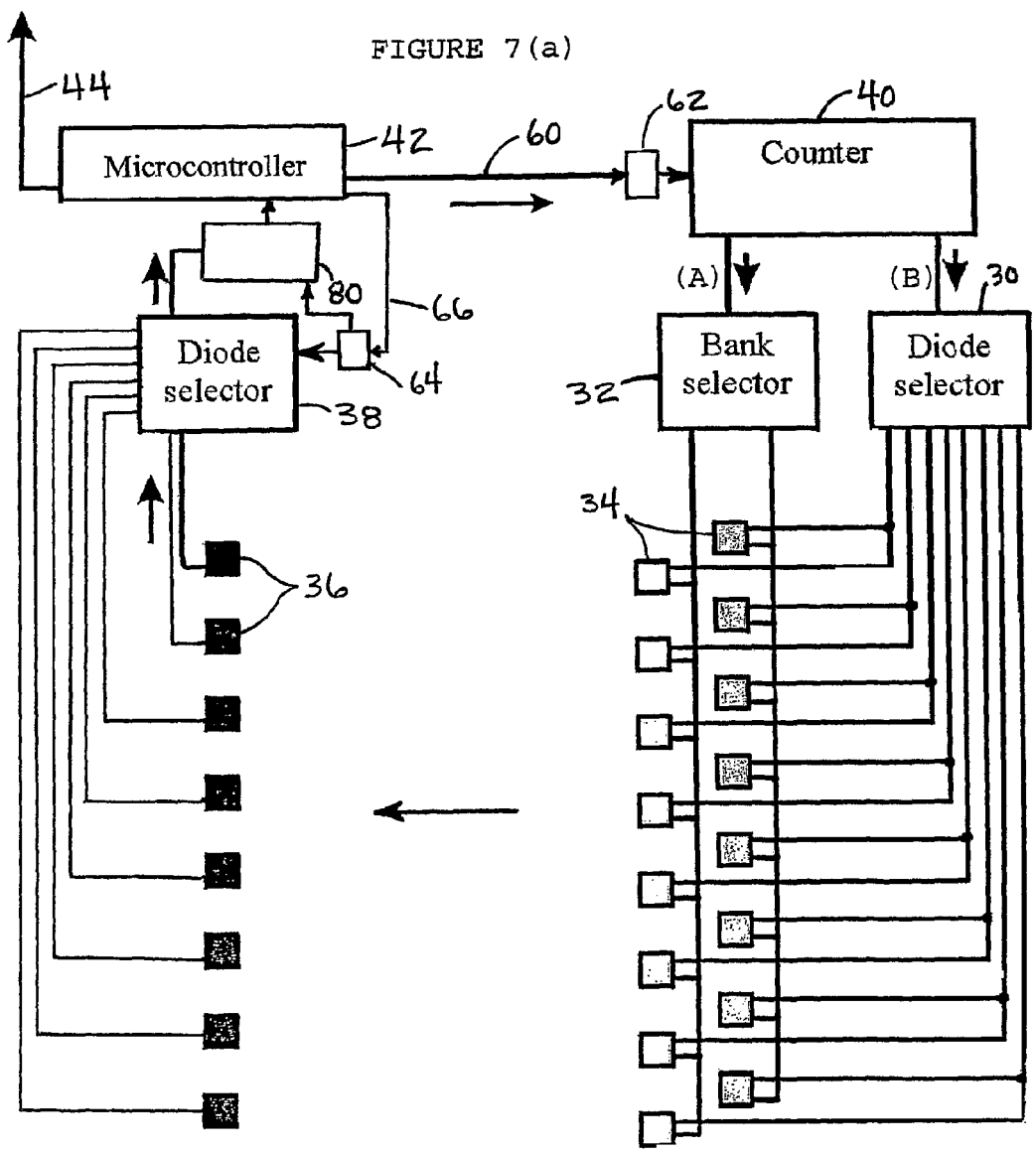
FIG. 7(a) is a schematic diagram of the circuitry used in the second aspect of the subject invention.

As shown in FIG. 7(a), an increased number of transmiter diodes (from 8 to 16 in the embodiment) are provided in two banks of 8 diodes each. Whereas the subject invention is able to make use of a 1-of-n diode selector as in the prior art, the addition of a 1-of-m bank selector and a respective AND-gate for the input to each transmitter diode allows a multiple of the prior-art number of transmitter diodes to be used. For instance, in the FIG. 7(a) arrange-mint a 1-of-8 transmitter-diode selector 30 and a 1-of-2-bank selector 32 are utilized to control sixteen transmitter diodes 34. Although eight receiver diodes 36 under the control of a 1-of-8 receiver-diode selector 38 are illustrated, four receiver diodes might, for instance, be utilized instead (as in the FIG. 5(b) embodiment). The overall effect is that a large number of transmitter diodes are utilized in comparison to the number of receiver diodes.

In operation, all of the receiver diodes 36 are selected sequentially. During the period of selection of each receiver diode 36, the diode turns off and on in a regular pattern to produce a series of "reception windows" (see FIG. 11). During the period of selection of each receiver diode 36, all of the transmitter diodes 34 are sequentially selected and activated in the following manner. A first bank is selected by the bank selector 32, and all of the transmitter diodes 34 in that bank are sequentially activated by the transmitter-diode selector 30; then, a second bank is selected by the bank selector 32, and all of the transmitter diodes 34 in that bank are sequentially activated by the transmitter-diode selector 30. The sixteen transmitter diodes 34 extend in-line and are arranged by height on the slam post as follows: first diode of bank 1, first diode of bank 2, second diode of bank 1, second diode of bank 2, third diode of bank 1, etc. The sequential activation of all of the transmitter diodes 34 is illustrated as "transmitter pulses" in FIG. 11. As subsequently further described and as can be seen from FIG. 11, the 16 transmitter diodes 34 are sequentially turned on during a period in which a receiver diode 36 is activated 16 times, each transmitter pulse being synchronized with each reception window.

Figure 7B:
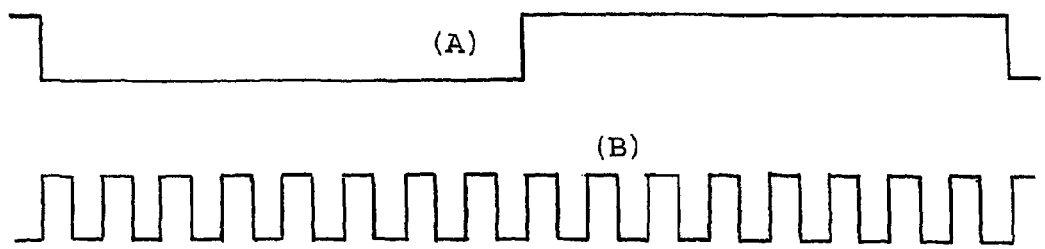
FIG. 7(b) illustrates signal waveforms produced by the counter on the transmitter (right) side of FIG. 7(a), for driving the bank selector and the diode selector.

The counter 40 on the transmitter (right) side of FIG. 7(a) produces the waveforms that are shown in FIG. 7(b) for, respectively, the bank selector 32 (waveform (A)) and the transmitter-diode selector 30 (waveform (B)). If a 1-of-4-bank selector were utilized for selecting among 32 transmitter diodes, the counter 40 would need to be replaced.

In the embodiment of FIG. 7(a), sixteen transmitter diodes 34 are sequentially activated during the time that each receiver diode 36 is activated. After reception on each of the 128 possible beam paths (8×16) has been tested by a microcontroller 42, a successful outcome (signals on all 128 beam paths received) results in a change in the amplified output signal being transmitted on line 44 to door-closing relays (not shown). A non-successful outcome (one or more signals not received) results in no change to the output signal to the door-closing relays, with the result that the door remains open. The door may be a single-panel door or may be a door formed from telescoping door panels.

With the two banks of transmitter diodes, i.e. 16 transmitter diodes with spacing as shown on the right side of FIG. 4, the inter-beam spacing at the right side of the doorway is less than one hand-width. This is achieved with only a marginal increase in cost over a system using only one bank of 8 transmitter diodes. By using two banks of transmitter diodes with a single 1-of-8 diode selector, as shown in FIG. 7 (a), only 10 printed circuit tracks are required rather than the 16 tracks required if a 1-of-16 diode selector were used. On the other hand, doubling the number of receiver diodes (from 8 to 16) on the left side in FIG. 7(*a*) would significantly increase the cost. The aim is therefore to increase the number of transmitter diodes while maintaining, or possibly even reducing, the number of receiver diodes.

The second aspect of the invention, involving improved noise rejection, is next described. An unmodulated pulse of approximately 10 microseconds in length is used; this can be compared to the one-millisecond (10 cycles of a 10 KHz carrier signal) length of a modulated infrared signal in use in a known conventional system. The power level of the pulse is at least 10 times greater than that in a conventional modulated signal (in which the pre-amplified received signal has only about 1 mV amplitude). The beam pulses are time-division multiplexed. With one of the receiver diodes active for receiving infrared signals, each of the transmitter diodes sequentially transmits a respective beam pulse. For each transmitted beam pulse, the receiver diode opens, for receiving that pulse, a synchronized sampling window of similar duration to the transmitted beam pulse. This is further described with respect to the pulse-sampling circuitry 80 that is shown in FIGS. 7(*a*) and 10.

With the conventional modulated beam, a synchronous rectifier circuit is required in the receiver circuitry; the conventional received signals are very weak (less than 1 mV) and a large amount of amplification is therefore required, that amplification also amplifying external noise. The synchronous rectifier circuit rejects the noise effectively, but the circuit can be overloaded by large pulses and in such case may allow recognition of a "false trigger". Using the beam pulse allows all of the infrared energy to be emitted in the single 10-microsecond flash. This allows the receiver circuitry to operate with a lower gain, so long as the circuit can reject impulse noise by gating the beam pulse at the right time. The greater energy intensity (about 10 times) and lower duration (about 1/100th) of the beam pulse, compared to the intensity and duration of a conventional modulated beam, "overwhelms" noise sources while using only about 1/10 of the power. The noise rejection is improved because the circuitry is only vulnerable while a sampling window of a receiver diode is open; it opens 16 times for respective pulses from the 16 transmitter diodes. During each opening of the window the corresponding intense infrared transmission pulse from a respective transmission diode overwhelms the noise signal.

Figure 6:
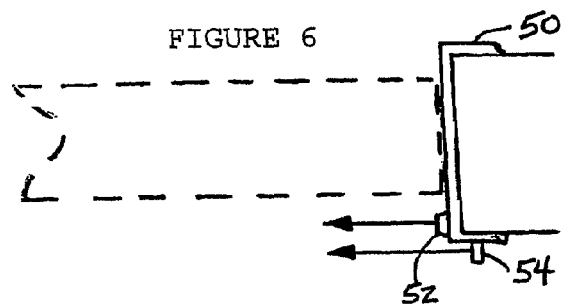
FIG. 6 is a plan view of a slam post in a side-opening door system of the subject invention, the view showing two locations for the transmitter diodes shown in FIGS. 4 and 5B.

The transmission diodes and receiver diodes are placed within respective plastics channel members (or "tubes"). The channel members for the transmission diodes have a cross-section corresponding to that shown in either FIG. 8(*a*) or FIG. 8(*b*). With reference to FIG. 6, a channel member 52 with the FIG. 8(*a*) cross-section extends down the front face of the slam post 50 so as to direct the infrared beam pulses toward the receiver diodes (not shown) on the other side of the doorway. The alternative channel member 54 with the FIG. 8(*b*) cross-section extends down a side of the slam post 50 at the alternative position shown in FIG. 6. The values of X1, X2 and X3 are 10 mm, 13 mm and 20 mm, respectively. The cavity designated 56 in FIG. 8(*b*) is one of a pair of 4 mm fixing holes for securing the channel member 54 to the side of the slam post 50.

Figure 8A:
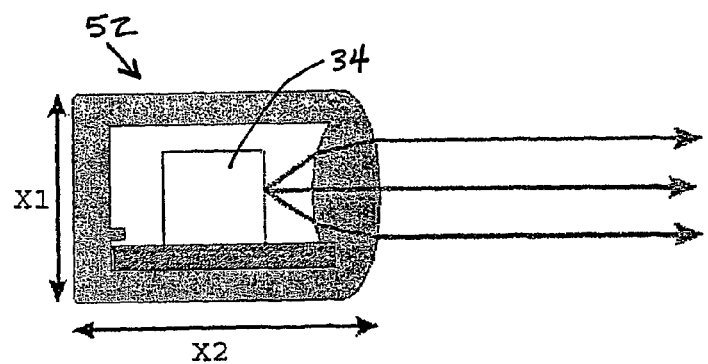
FIG. 8(a) is a cross-section through a first type of channel member used for housing transmitter diodes, the channel member being positionable on a front surface of a slam post.
Figure 8B:
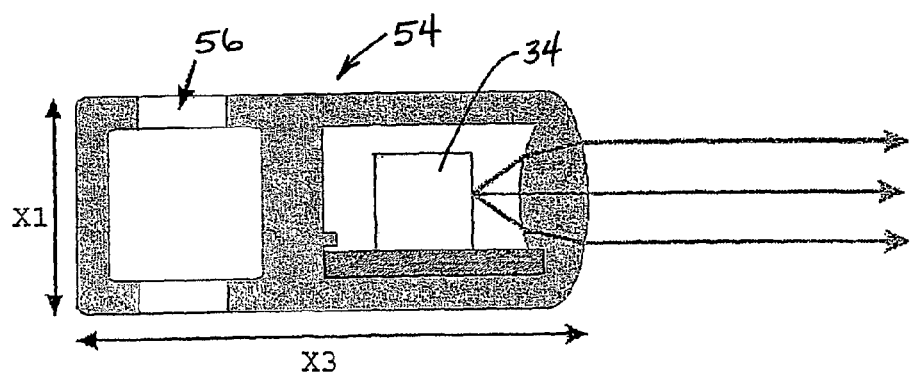
FIG. 8(b) is a cross-section through a second type of channel member used for housing transmitter diodes, the channel member being positionable on a side surface of the slam post.

Three sides of the plastics channel members 52 and 54 are opaque, but the fourth side (the right side in FIGS. 8(*a*) and (*b*)) of each is infrared transparent and formed into a cylindrical lens for focusing the infrared beam pulses emitted sequentially by the transmitting diodes 34 to generate a vertical "fan" of infrared radiation directed toward all of the receiving diodes 36 (FIG. 7(*a*)); as discussed above, only one of the receiving diodes 36 is active at any one time. Each of the channel members 52 and 54 is 2 meters long and made from a polycarbonate co-extrusion.

FIG. 9(*a*) illustrates a composite channel member arrangement, formed by three parts: an aluminum reinforcing bar 70, an opaque first plastics member 72 having three sides, and an infrared-transparent second plastics member 74. The two plastics members 72 and 74 are formed as a co-extrusion, and together define a plastics housing for a set of infrared transmitter diodes or receiver diodes. The black walls of the first plastics member 72 reduce the possibility of unwanted light being transmitted and received via reflected paths, and keep out unwanted sunlight which might saturate the receivers. The infrared-transparent second plastics member 74 is formed in the shape of a lens for focusing the infrared light. The back side of the first plastics member 72 and front side of the aluminum reinforcing bar 70 are shaped to form a mating key and keyway 76, a male key segment being on the first plastics member 72 and the mating female keyway segment being on the bar 70. This construction allows the bar 70 to be fitted in place on the transmission side or reception side of the doorway before the plastics housing is installed. It has the advantages of allowing the plastics housing to be constructed separately as a sealed unit impervious to dust and water (meeting at least the sealing standard IP65), while also allowing the bar 70 to provide rigidity to the flexible plastics housing once they are slid together using the keyway 76.

FIGS. 9(*b*) to (*d*) illustrate in cross-section other forms of composite channel member, and FIGS. 9(*e*) to 9(*h*) are further views of the FIG. 9(*d*) channel member. The channel member 80 of FIG. 9(*b*) is securable to a side of the slam post 50 (FIG. 6) in the same way as the channel member illustrated in FIG. 9(*a*). It consists of a bracket 82 formed of extruded aluminum and having a first section 84 with holes 86, and an integral second section 88 extending normal to the first section 84. A male key segment 90-1 is integrally formed in the second section 88. The channel member 80 also consists of a sealed tubular housing 92 formed of extruded plastics. A series of transmitter diodes 94 are mounted inside the housing 92, spaced from each other along the length of the housing 92. A female keyway segment 90-2 is formed in the base 94 of the housing 92. As with the channel member of FIG. 9(*a*), the housing 92 is formed from two types of plastics that are co-extruded, a first opaque plastics forming the base 94 and two sides 96 of the housing 92, and a second transparent plastics forming a lens 98 for focusing the infrared light, FIG. 9(*c*) is similar to FIG. 9(*b*), except that the male key segment 90-1 is integrally formed in the first section 84. The first section 84 in FIG. 9(*c*) is shown abutting a slam post 100 of an elevator door such that the infrared light extends normal to the slam post 100; this would be the case, for instance, if the channel member had the same position as the channel member 52 of FIG. 6. The first section 84 has a pair of support arms 102 for providing side support to the housing 92.

FIGS. 9(*d*) to 9(*h*) are various cross-sectional and perspective views of a further embodiment of the invention. It includes a sealed tubular housing 104 similar to the housing 92 of FIGS. 9(*b*) and 9(*c*), except that a key and keyway are not used. Instead, the housing 104 is held by a series of resilient (e.g. spring steel) clips 106 spaced at intervals along the length of the housing. Each clip is shaped internally to conform to the outer shape of the housing so as to enclose it except for the radiation-transparent face. In this embodiment that face is provided within a shoulder 107 which is engaged by a curved end portion 109 of the clip. The clip has a tail portion 110 shaped to bear upon and grip an edge of the slam post and to hold the main body portion 108 of the clip against the post.

Inside the housing 104 are a series of spaced transmitter diodes 114 fed by a power cable 116 at one end of the channel member 103. Thirty-two of the diodes 114 are spaced from each other along a composite printed circuit board (PCB) 118 formed by connecting end-to-end four PCBs 120 each approximately two feet long. As can be seen from FIG. 9(h), the composite board 118 is fitted such that its sides fit within a respective channel formed in the housing 104. Adjacent ones of the PCBs 120 are connected together by a connector 122. Each PCB 120 has eight transmitter diodes 114 mounted on it, each diode being directed normal to the length of the PCB 120. The diodes 114 toward either end of the composite printed circuit board 118 are oriented at an angle to the normal; the reason for this can be seen from considering the right side of FIG. 5(b).

FIG. 9(g) illustrates the composite PCB 118 positioned inside the housing 104, extending from the power-cable end 124 to the other end 126, and FIG. 9(h) is a sectional view of the housing 104 at a section through the leftmost transmitter diode 114 shown in FIG. 9(g). End caps are provided at 124 and 126 to locate the composite PCB 118 longitudinally of the housing 104 and to seal out moisture and foreign matter.

Since only four receiver diodes are utilized (leftside of FIG. 5(b)), a single elongated PCB is not used on the receiver side. Instead, the four receiver diodes are each positioned in the receiver housing on a respective receiver PCB (not shown), and the four receiver PCBs are mounted on a plastics carrier strip that extends the length of the receiver housing and is located by caps in the same way as the composite PCB 118. The four receiver PCBs are connected by a ribbon cable.

The lens forming the left side of the housing 104 in FIG. 9(d) has a planar inner face and a convex outer face. The contour on the outer face is such that radiation leaving the transmitter diode 114 at up to 602 to the horizontal is redirected such that all the radiation leaves the convex surface approximately normal to the length of the PCB 118. This is also illustrated in FIGS. 9(b) and 9(c).

The housing 104 is supported in use against vertical (lengthwise) movement by frictional engagement with the clips 106, and is removed from the slam post by prising the clips free from the post. Alternatively, the clips are dimensioned such that the housing 104 is a sliding fit, so the housing can be removed by being slid upward so to move out of the clips 106 while the clips 106 remain in situ or the slam post. Upward sliding movement of a housing 104 is not limited by the presence of the ceiling on each landing of an elevator system, since the housing normally sits close to or within the shaft of an elevator; replacement of the housing 104 occurs during regular servicing of the elevator.

FIG. 10 illustrates the pulse-sampling circuitry 130 of the infrared obstruction detector. Its position between the receiver diode selector 38 and the microcontroller 42 is shown in FIG. 7(a). A sample-and-hold system is employed by pulse-sampling circuitry 130 to remove the effect of DC offsets and noise from the infrared pulses. When each transmitter diode 34 is pulsed with about 500 mA for 10 µs, a bright flash of infrared light is emitted. The pulse is bright but short-lived, and so it is necessary to make sure that the signal is received with a minimum of noise disturbance, and with an amplitude accurately measured with respect to the bright ambient background illumination. The great majority of the background signal is removed by using a fast AC-coupled amplifier 132 which cannot pass the DC-component of the ambient light, but other fluctuations in light and electrical noise are still able to get through. For example, a transient signal change occurs when a shadow passes over a receiver diode, or when a motor emits a burst of spark-generated RF noise. To minimize these noise effects some form of "noise subtraction" is needed, and this is achieved by serially connecting to the output of amplifier 132 a sampling capacitor 134 and a ground-clamping switch 136. The output of the sampling capacitor 134 is also connected to pulse-measurement circuitry 138.

The sampling capacitor 134 has a dual function. Firstly, it blocks the DC voltage output from the amplifier 132, and secondly, it acts as a charge storage element. The operation of the ground-clamping switch 136 has timing synchronized with the operation of the transmitting circuit, the switch 136 being connected to ground during times when none of the transmitting diodes 34 are being pulsed (the "inter-pulse period"). By connecting the output of the sampling capacitor 134 to ground during the inter-pulse period, its input is charged by the amplifier 132 and it takes up a mean level corresponding to the DC plus noise signal. If no connection to ground were made during the inter-pulse period, the charge on the output of the sampling capacitor 134 would "sag", taking up an undefined level determined by the leakage and noise level component; when the next pulse was received, it would start from such undefined voltage level on the sampling capacitor 134 and its amplitude would be measured incorrectly. By having the amplifier 132 continuously operate and the ground-clamping switch 136 closed during inter-pulse periods, the sampling capacitor 134 has a mean level corresponding to the (DC+noise level) during such periods. With the ground-clamping switch 136 in an open state while a pulse is received on the receiver diode 36 (creating one of the reception windows shown in FIG. 11), the increased output of the amplifier 132 is superimposed on the mean level and passes to the pulse-measurement circuitry 138. Circuitry within pulse-measurement circuitry 138 is not shown, but consists of an integrating capacitor which stores an aggregate value for the amplitude of the pulses received by each receiver diode 36 after pulses have been received from all sixteen transmitter diodes 34, and an A/D converter that converts that aggregate value to a digital value that is interpreted by the microcontroller 42. It will be appreciated that timing circuitry (not shown) is required for causing the receiver diode selector 38 to switch between each receiver diode 36 for input to the amplifier 132.

The correspondence in timing between the infrared beam pulses of the transmitter diodes 34 and the opening of the ground-clamping switch 136 to create the reception windows is illustrated in FIG. 11.

A further important feature is the use of trigger means in the FIG. 7(a) circuitry to ensure that the transmitting diodes 34 and receiving diodes 36 are synchronized such that, for receiving transmitted beam pulses, the ground-clamping switch 136 is opened 16 times to provide 16 windows for receiving respective pulses from the 16 transmitting diodes 34; the duration of each receiving window must match the duration of each transmitted beam pulse. A difficulty arises in that a timing cable 60, extending from the microcontroller 42 to the counter 40, has to be sufficiently long to extend from one side of the doorway to the other. Depending upon the relative placement of the transmitting and receiving circuits at the doorway, the cable 60 may be as long as 3 meters. The microcontroller 42 sits proximate the receiving diodes 36, and transmits a clock signal down the cable 60 to the counter 40 which sits proximate the transmitting diodes 34. Cable capacitance is dominant at the relatively-low frequency of the subject system, and that capacitance delays the transfer of rising and falling edges of the clock signal. The rising and falling edges become ramped (having a few microseconds of rise and fall time), and need to be reconstructed if the transmitting circuitry is to be in accurate synchronization with the receiving circuitry. Considering that each transmitted pulse lasts only approximately 10 microseconds, a few microseconds of rise and fall time is critical. The edges are reconstructed for entry into the counter 40 by a Schmitt-trigger circuit 62 (and also possibly some noise filtering). It is desirable also to insert a corresponding Schmitt-trigger circuit 64 into the cable 66 extending from the microcontroller 42 to the ground-clamping switch 136 and the receiver-diode selector 38.

While the present invention has been described in its preferred embodiments, it is to be understood that the words which have been used are words of description rather than limitation, and that changes may be made to the invention without departing from its scope as defined by the appended claims.

Each feature disclosed in this specification (which term includes the claims) and/or shown in the drawings may be incorporated in the invention independently of other disclosed and/or illustrated features.

The text of the abstract filed herewith is repeated here as part of the specification.

A safety sensing system includes an apparatus for use in a doorway having a powered door slidable for closure of the doorway. The apparatus includes radiation transmitters and/or receivers for providing a curtain of detection beams across the doorway, and is formed as a composite structure that includes: a fixative member connectable by securing means to a side of the doorway at a door frame, the fixative member including a first portion of a mating connection means; and, a housing containing a plurality of the transmitters and/or receivers along its length, and including a second portion of the mating connection means for attaching the sealed housing to the fixative member. The mating connection means allows the housing to be removed and replaced while the fixative member remains in situ.

The invention claimed is:

1. A safety sensing apparatus for use in a doorway having a powered door slidable for closure of the doorway, the apparatus comprising:
   a housing adapted to house at least one of a plurality of radiation transmitters for transmitting radiation across the doorway and a plurality of radiation receivers for receiving radiation transmitted across the doorway;
   an elongated fixing portion for releasably fixing the housing to one of the powered door and a frame of the doorway, the elongated fixing portion includes a first portion of a mating connection extending along a length thereof and is adapted to be mounted to one of the powered door and the frame; and
   a second portion of the mating connection included in the housing that is adapted to releasably engage the first portion of the mating connection such that when the elongated fixing portion is fixed to one of the powered door and the door frame the housing can be detached from the elongated fixing portion and replaced while maintaining the fixing portion in a fixed position and maintaining a connection between the fixing portion and the at least one of the powered door and the door frame.

2. The apparatus of claim 1, wherein the housing is an elongated, sealed housing in which the transmitter or receiver elements are spaced apart along the length of the housing and oriented to transmit or receive radiation respectively through a radiation-transparent side of the housing.

3. The apparatus of claim 2, wherein the housing includes opaque sides that restrict passage of radiation there through.

4. The apparatus of claim 3, wherein the radiation-transparent side of the housing is integrally-formed with the opaque sides.

5. The apparatus of claim 4, wherein the radiation-transparent side is formed as a co-extrusion with the opaque sides of the housing.

6. The apparatus of claim 5, wherein the housing is formed as a plastic co-extrusion.

7. The apparatus of claim 2, wherein the radiation-transparent side of the housing is shaped so as to focus radiation passing therethrough.

8. The apparatus of claim 7, wherein the radiation-transparent side of the housing includes a planar inner surface and a convex outer surface.

9. The apparatus of claim 1, wherein the housing includes a generally rectangular, tubular cross-section.

10. The apparatus of claim 1, wherein one of the first portion and the second portion includes a key and the other of the first portion and the second portion includes a mating keyway, the first portion and the second portion being connectable by sliding the key into the keyway.

11. The apparatus of claim 10, wherein the second portion is formed integrally with the housing.

12. The apparatus of claim 1, wherein the fixing portion is configured to attach the housing at least approximate to a surface of one of the door and door frame such that the transmitters or receivers respectfully transmit and receive radiation parallel to the surface.

13. The apparatus of claim 1, wherein the fixing portion is configured to attach the housing at least approximate to a surface of one of the door and door frame such that the transmitters or receivers respectfully transmit and receive radiation normal to the surface.

14. The apparatus of claim 1, wherein the fixing portion encloses the housing to engage and retain the housing.

15. The apparatus of claim 14, wherein an internal shape of the fixing portion is similar to a shape of the outside of the housing.

16. The apparatus of claim 14, wherein the fixing portion is adapted to be secured to the door or door frame by a resilient clip for gripping an edge of the door or door frame.

17. The apparatus of claim 1, wherein the powered door is an elevator door.

18. The apparatus of claim 1, wherein the first and the second portions of the mating connection are adapted to be slidably coupled together.

19. The apparatus of claim 18, wherein the first and the second portions of the mating connection are adapted to be slidably coupled together along a plane that is substantially parallel to a planar surface of the door.

20. A safety sensing apparatus for use in a doorway having a powered door slidable for closure of the doorway, the apparatus comprising:
   at least one of a plurality of radiation transmitters and a plurality of radiation receivers arranged for respectively transmitting and receiving radiation across the doorway;
   an elongate housing adapted to house one of the radiation transmitters and the radiation receivers; and
   a radiation-transparent side of the housing that permits passage of radiation there through, the radiation-transparent side is shaped to focus radiation passing there through.

21. The apparatus of claim 20, wherein the plurality of radiation transmitters are orientated to transmit radiation through the radiation-transparent side of the housing; and wherein the plurality of radiation receivers are orientated to receive radiation through the radiation-transparent side of the housing.

22. The apparatus of claim 20, wherein sides of the housing adjacent to the radiation-transparent side are opaque to radiation.

23. The apparatus of claim 20, wherein the radiation-transparent side of the housing includes a planar inner surface and a convex outer surface.

24. The apparatus of claim 20, wherein the radiation transparent side of the housing is integrally-formed with other sides of the housing.

25. The apparatus of claim 24, wherein the radiation transparent side is formed as a co-extrusion with the other sides of the housing.

26. The apparatus of claim 25, wherein the housing is formed as a plastics co-extrusion.

27. A safety sensing apparatus for use in a doorway having a powered door slidable for closure of the doorway, the apparatus comprising:

an elongated transmitter housing including:
- a plurality of radiation transmitters mounted therein;
- a radiation-transparent sidewall that is curved to focus radiation that passes there through;
- a plurality of opaque sidewalls that restrict passage of radiation there-through; and
- a first connection device;

a transmitter housing mount including a second connection device adapted to releasably cooperate with the first connection device to couple the elongated transmitter housing to the transmitter housing mount; and an elongated receiver housing including a plurality of radiation receivers mounted therein, the number of radiation transmitters mounted in the transmitter housing is greater than the number of radiation receivers mounted in the receiver housing.

* * * * *

UNITED STATES PATENT AND TRADEMARK OFFICE
CERTIFICATE OF CORRECTION

PATENT NO. : 7,755,024 B2 Page 1 of 1
APPLICATION NO. : 11/667782
DATED : July 13, 2010
INVENTOR(S) : Terence Platt et al.

It is certified that error appears in the above-identified patent and that said Letters Patent is hereby corrected as shown below:

Column 1, line 51 (Page 2, line 18), "arrange-mint" should be --arrangement--.

Column 5, lines 25-26 (Page 8, line 15), "elongate" should be --elongated--.

Column 6, line 30 (Page 14, line 6), "arrange-mint" should be --arrangement--.

Column 6, line 32 (Page 14, line 8), "arrange-mint" should be --arrangement--.

Column 6, line 34 (Page 14, line 10), "arrange-mint" should be --arrangement--.

Column 6, line 36 (Page 14, line 12), "arrange-mint" should be --arrangement--.

Column 6, line 40 (Page 14, line 16), "transmiter" should be --transmitter--.

Column 7, line 57 (Page 17, line 18), "ajar-cent" should be --adjacent--.

Column 8, line 5 (Page 18, line 7), "transmiter" should be --transmitter--.

Column 8, line 12 (Page 18, line 13), "arrange-mint" should be --arrangement--.

Column 11, line 37 (Page 26, line 22), "602" should be --60--.

Column 12, line 62 (Page 30, line 4), delete the extra space after the word "meters".

Column 14, line 2 (Page 2, line 14), "there through" should be --therethrough--.

Column 14, line 59 (Page 2, line 14), "elongate" should be --elongated--.

Column 14, line 62 (Page 6, line 16), "there through" should be --therethrough--.

Column 14, lines 63-64 (Page 6, line 17), "there through" should be --therethrough--.

Column 14, line 2 (Page 2, line 14), "there through" should be --therethrough--.

Column 16, line 4 (Page 8, line 6), "there through" should be --therethrough--.

Column 16, line 7 (Page 8, line 8), "there-through" should be --therethrough--.

Signed and Sealed this

Thirtieth Day of November, 2010

David J. Kappos
*Director of the United States Patent and Trademark Office*